United States Patent [19]
Wefers et al.

[11] 3,846,623

[45] Nov. 5, 1974

[54] SCANNING MEANS

[75] Inventors: Norbert Wefers; Uwe Militz; Uwe Unglaube, all of Berlin; Jan de Meer, Wurzburg, all of Germany

[73] Assignee: Nixdorf Computer AG, Paderborn, Germany

[22] Filed: Feb. 22, 1973

[21] Appl. No.: 334,644

[30] Foreign Application Priority Data

Feb. 22, 1972 Germany .......................... 22083199

[52] U.S. Cl. .......................... 235/61.11 E, 250/555

[51] Int. Cl. .......................... G06k 7/01, G08c 9/06

[58] Field of Search .............. 235/61.11 E, 61.11 D; 250/219 D, 219 DC, 219 DD, 555, 566; 332/9, 31, 37, 38; 329/109, 126; 178/7, 6; 360/2

[56] References Cited

UNITED STATES PATENTS

| | | | |
|---|---|---|---|
| 3,701,886 | 10/1972 | Jones | 235/61.11 E |
| 3,714,397 | 1/1973 | Macey | 235/61.11 E |
| 3,745,354 | 7/1973 | Vargo | 235/61.11 E |
| 3,761,725 | 9/1973 | Meyer | 250/555 |

*Primary Examiner*—Daryl W. Cook
*Attorney, Agent, or Firm*—Hauke, Gifford, Patalides & Dumont

[57] ABSTRACT

Process and circuit arrangement for generating a pulse train of constant pulse amplitude from a bivalent signal sequence of variable signal amplitude on which is super-imposed a time varying undirectional disturbance.

17 Claims, 5 Drawing Figures

SCANNING MEANS

BACKGROUND OF THE INVENTION

The invention relates to a process and a circuit arrangement in which a pulse train of constant pulse amplitude is generated from a bivalent signal sequence of variable signal amplitude, on which is superimposed by a time varying unidirectional disturbance by comparing purpose a threshold value which, during the signal transitions is traversed between its maximum and minimum values to the signal sequence itself, especially for evaluating optical scanned line-coded data.

A process of this type has to be carried out especially when non-reproducible bivalent signal sequences are to be evaluated. For this purpose, the signal sequences have to be separated and each signal sequence converted to an a pulse train of constant pulse which amplitude is suitable for feeding to logical switching circuits for evaluation. Thereby, mostly signal sequences are involved which are generated without timing pulse control and in which is present a unidirectional time varying disturbance for example, caused by a disturbance that is constantly present and subject to variations. This can be the case when bivalent signal sequences are transmitted via a direct current channel, in which the current direct cannot be kept constant. Disturbances of this type manifest themselves not only as fluctuation of the difference between the maximum and minimum values of the transmitted signal, but also as fluctuations of the absolute amplitude values which per se characterize two possible states.

Signal sequences of the type considered here which under certain conditions are also non-reproducible are generated, for example, during the scanning of line-coded data. Such data may be recorded on an information carrier magnetically, optically, electrostatically or dielectrically, and are read by means of appropriate reader means. Thereby, it is advantageous to generate a relative motion between the information carrier and a scanner which in its simplest form, is a scanning probe displayed by hand over the information carrier. Likewise, electrical or mechanical scanning devices may be provided which scan the individual information storage positions in a predetermined sequence.

When the contrast or difference is value between the signal supplied by the blank portions of the information carrier without and that supplied by the portions scanned having information bits thereon is a non-constant, there is formed a signal sequence which contains the contrast variation as a time varying fluctuation. This can be caused by non-uniform dielectrical properties of the respective information carrier in the case of electrostatically or dielectrically stored data, or in the case of optically stored data by non-uniform reflective properties of the information carrier. During the scanning, additional non-uniformities of the stored information bits themselves can result in further variations of the signal amplitudes, also with respect to the two predetermined values.

The generation of pulse trains from data stored in such manner has found an especially important field of application in readers with which line-coded data can be scanned. For instance, the information on labels affixed to merchandise can be read by means of a reader operating according to this principle when a specially designed light pencil and reader is translated by hand over the label, thus scanning its coded data or the light reflections produced on the latter. Of course, such information carriers do not always have a uniform degree of reflection since they are cheaply manufactured by mass production. Furthermore, their reflective power can be partially or totally impaired by unpredictable external influences.

All the above-mentioned forms of applying such evaluations of information have a problem in common in that the superimposition of a time varying component upon the variable amplitude values of the signal sequences containing the data does not make it possible to operate logical switching circuits which only evaluate exactly defined signal states. This is especially the case when during a signal sequence, such great losses of signal frequency sweep occur that individual signals have too low a signal-to-noise ratio with regard to the respective reference value.

It is already known to decouple capacitatively only the alternating component of the signal sequence to be evaluated. However, such circuit arrangements fail when the signal frequency varies over a large range or when interfering frequencies which are superimposed over the signal component or the direct disturbance component lie in the frequency range of the signal sequence. In that case, the high-pass time constant of the capacitive coupling cannot be adjusted to a value which is uniformly suitable for all signals.

As is further known, a constant threshold value lying between two possible signal values can be generated for a signal sequence by statistical evaluating the signal amplitudes of the respective signal sequence and from the result, a threshold value is fixed at the end of a signal sequence to make it possible to subsequently distinguish between the signal values. However, this technique is not satisfactory for the evaluation of non-reproducible signal sequences and also not for the evaluation of signal sequences in which the amplitude values and the superimposed unidirectional disturbance vary within wide limits because a constant threshold value does not guarantee an unobjectionable separation of the signal states afterwards.

SUMMARY OF THE PRESENT INVENTION

It is the object of the invention to provide a process in which an pulse train of constant pulse amplitude is generated from signal sequences of the described type, which process reliably operates even at great variations of the signal amplitude value and makes it possible to generate a threshold value which continuously and reliably separates the two posible signal states and thus secures their reproduction with two definite amplitude values.

To accomplish this object, a process of the above-named type is according to the invention so designed that the signal amplitude value which each time exists before a signal transition is stored and during the time following the start of the signal transition, serves as maximum value or minimum value together with the signal amplitude value following the signal transition and being derived as minimum value or maximum value, said values serving to control the generation of a mean value used as threshold value for the next following signal transition.

This process makes it possible to generate an unobjectional bivalent pulse pulse train because there is generated a threshold value for distinguishing between the two possible amplitude values, which threshold value is continuously so adapted to the actual signal amplitude values that an almost ideal separation of the two signal states becomes possible.

The starting point of the invention is the requirement that the threshold value making the evaluation possible is not to be calculated as constant value and optimal value for the total signal sequence after the respective signal sequence has ended, but is to be rendered variable over elements of the signal sequence as small as possible and thus, is to be continuously adjusted to the variations which are caused by the superimposed unidirectional time varying component. When one starts considering that the signal sequence itself could be separated from the superimposed unidirectional time varying component by a capacitative element, then, the ideal course of a threshold value making possible faultless distinction between both signal amplitude values exactly corresponds to the course in time of the superimposed undirectional time varying component. This is because the amplitude values of the signal sequence fluctuate on either side of the superimposed undirectional time varying component so that a threshold value making possible unobjectionable distinction between them has to follow a course midway between the respective extreme values, in accordance with the undirectional time varying component. When the signal amplitude value existing each time before a signal transition is stored for a short time and when this value and the signal amplitude value following the signal transition having the opposite sign serve to form a mean value, this mean value can be used as threshold value for the following signal transition. This results in a steadily changing threshold value while the direct disturbance changes, which threshold value has in certain cases a different position for each signal transition. This type of threshold value already very closely approximates the ideal course described above because at each signal transition, there is available a threshold value which would have been the ideal one for the signal transition which just had taken place. Thus, with respect to the signal sequence, the ideal behavior of the threshold value is merely shifted in time by a signal element.

Within the framework of further developing the invention, the stored signal amplitude value is altered by a predetermined amount before the computation of the mean value in the direction of the first-mentioned signal transition.

This additional measure has the effect that the respective two signal amplitude values can be reliably distinguished even when considerable signal modulation fluctuations are present when, for example, the loss of the signal transitions exceeds 50 percent. In this manner, the threshold value so to speak "travels" with the signal pattern because after each signal transition, the threshold value is adjusted to a value which lies between the mean value of the edge traversed at the signal transition and the immediately following signal amplitude value. When the threshold value together with the signal pattern is supplied to a comparator, the original bivalent information with defined level measurements is available at the comparator output even when the signal modulation frequency fluctuations are very large.

A further advantage of a traveling threshold value, or a threshold value following the signal course, consists in avoiding the disadvantages of using a comparator which in certain cases is provided with a hysteresis-type circuit. These disadvantages normally manifest themselves in that at the moment of the signal traversal, the threshold value of the comparator jumps in the oppsite direction of the signal pattern whereby there results a reduction in threshold sensitivity. This disadvantage can be eliminated, depending upon the magnitude of the change of the respective signal amplitude value.

Advantageously, the passing of the signal through the threshold value during a signal transition is evaluated as criterion for the start of the change of the respective stored signal amplitude value. This ensures that the changed signal amplitude value which together with the respective following signal amplitude value is to form a mean value, is reliably available for a long enough time to make the formation of a mean value possible. Advantageously, the respective changed signal amplitude value is then stored at least until the end of the immediately following signal amplitude value so as to make it unnecessary to provide any special additional storage devices which store the mean value formed by both values, i.e., the respective new threshold value, until the next signal transition takes place.

In a further development of the process of the invention, the signal amplitude values are read into a minimal value storage and a maximal value storage, the storage contents of which at each signal transition, are approximated to each other by a predetermined amount which is adjusted relative to the difference of the storage contents. This relative determination results in the considerable advantage that the same effectiveness of signal separation is ensured for all possible values of the signal frequency sweep. In this further development of the invention, the already described change of the respective signal amplitude value in direction of the respective following signal transition is thus accomplished within the framework of a mutual approximation, i.e., simultaneously for both signal amplitude values, the stored value and the one following it. However, the approximation is effective only with respect to the stored signal amplitude value, because the actual signal amplitude value following it above all determines the store content of the storage circuit. The relative adjustment of the amount of change adapts the approximation method to all variations of the signal frequency sweep and thus makes this method uniformly effective for all signal states. Moreover, it is possible to use the same approximation circuit for both storage circuits and to accomplish universally the described change of the respective stored signal amplitude value for both possible signal states by using one single circuit. Moreover, especially advantageous properties result when the signal frequency sweep drops considerably which will be described later on by way of a practical example of application.

The predetermined relative amount at the approximation of the two storage contents can be calculated in an especially simple manner when the approximation is carried out for a time chosen to correspond to the predetermined relative amount and when a time constant is used which, at the most, equals the shortest expected time for a signal transition. This ensures that the same predetermined relative amount of change is always produced for each change occurring in the respective stored signal amplitude value. In addition, this change practically runs parallel to the respective signal transition so that the mean value determining the following threshold value is available after the signal transition within as short a time as possible.

For evaluating bivalent signal sequences, for example in a label reader, one generally uses manual scanning by means of a reading probe. Such a scanning method is characterized in that the signal sequence provided by one scanning is separated from the next signal sequence by an intervening signal interruption and a signal pattern having a substantially constant signal amplitude whereby this signal amplitude mostly corresponds to the degree of reflection of the information carrier not provide with information data. In order to evaluate such signal sequences, the process of the invention further contemplates that during each signal pattern, an approximation is effected of the two storage contents using a time constant longer than the longest expected signal transition time of the signal transition following the mentioned signal pattern, but shorter than the shortest effected signal pattern; the purpose is to obtain almost agreeing storage contents and to reduce the effective storage content of the minimum value storage in opposite direction of the signal transition occurring at the start of the signal pattern.

These special measures are meaningful when the invention is used for instance, in a label reader, considering that before the start of a reading operation, the threshold value for the first signal transition has to be reliably established although there is yet no information available as to how large the signal modulation occurring during the first signal transition. Hence, the threshold value for the first signal is going to be has to be brought into a range for which it can be beforehand reliably determined that a reliable recognition is possible even at small contrast values of the information bit characterized by the first signal transition. This determination depends upon the experimental values of the contrast or the different degree of reflection of the recorded and unrecorded areas of the information carrier. The degree of attenuation for the storage content of the minimum value storage has to be adjusted accordingly.

The long time constant is necessary in order to ensure that the store containing the essentially constant signal amplitude follows to a large extent the signal at the first signal transition before the threshold value is traversed. The approximation of both storage contents having a large time constant and the simultaneous reduction of the effective storage content in the mentioned manner have the effect that the mean value of the two storage contents formed as a threshold value slowly enters the above-described range without being impaired by short-time disturbances. Otherwise, the storage content of the store being considered could arrive at a value corresponding to that of the storage content of the other store, and the described simple method of forming a means value in the mentioned range would become impossible.

Following the period of time during which the signal pattern has an essentially contant signal amplitude, the approximation circuit is once more switched over to the smaller time constant, and the reduction of the one storage content no longer takes place.

DESCRIPTION OF THE DRAWINGS

Further details as to the operating possibilities of the signal separation can be deduced from the following example for carrying out the invention illustrated in the attached drawings, which example concerns the application of the invention to a label reader.

DESCRIPTION OF THE PREFERRED EMBODIMENTS

The subsequently described embodiments of the invention disclose applications of the invention to a label reader, but it will be appreciated that the invention is in the same manner applicable to other forms of information recording since the reading itself as well as the conversion of the thereby obtained values to electrical signal sequences are not immediately connected with the generation of impulse trains of constant impulse amplitude which are generated from such signal sequences.

Figure 1:
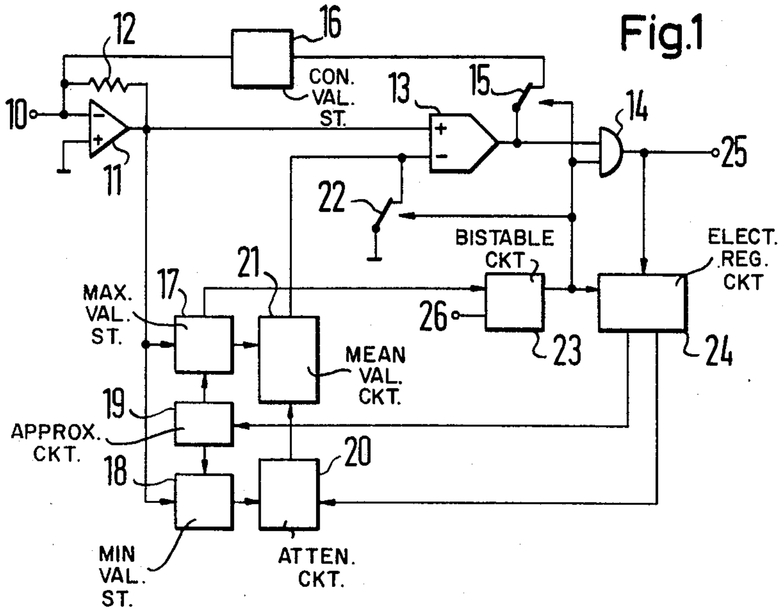
FIG. 1 shows a simplified block diagram of a circuit arrangement for carrying out the process of the invention in a label reader.

FIG. 1 illustrates, in a block diagram form, the operation of a circuit arrangement for carrying out the process of the invention. The scanning of a line-coded label by a light pencil provides at the output of an optical electrical transducer signals which are fed via an input 10 to the inverting inverting of an input amplifier 11. These signals are eventually converted to a pulse train of constant pulse amplitude which appears at an output terminal 25. The input inverting amplifier 11 is provided with negative feedback by a resistance 12 which leads from the output of the amplifier to its inverting input. To the output side of the amplifier 11, there is coupled a comparator 13, to the second input of which the threshold value is fed as a reference voltage, the threshold value being generated in a manner later to be described. The output of the comparator 13 is connected to the inverting input of the input amplifier 11 via a control loop which includes a switching device 15 and a control value store 16. The object and function of this control loop is subsequently described in more detail. The output of the comparator 13 is also connected to the output terminal 25 of the circuit via an AND-gate 14. When the threshold value is compared with the signal value which each time is supplied by the input amplifier 11, an increasing or decreasing impulse edge is always generated via the AND-gate 14 when the input signal passes through the threshold value.

The output signal which is supplied by the input amplifier 11 as amplified low-impedance voltage signal is fed to maximum value store 17 and minimum value store 18 which are controlled by an approximation circuit 19. Both storages 17 and 18 control a mean value circuit 21 by which the threshold value as mean value of the respective two storage contents is fed to the inverting input of the comparator 13. The minimum value store 18 is connected to the mean value circuit 21 via an attenuation circuit 20 which can be switched on and off by an electrical control circuit 24. In addition, the control circuit 24 effects switching of the approximation circuit 19 between a small time constant and a large time constant. The control circuit 24 is controlled by the output signal at output 25 as well as by a bistable circuit 23 which is set by the first appearance of a maximum value of predetermined magnitude occurring in the maximum value store 17 and which only at the end of a complete signal sequence is reset by a normalizing or resetting signal applied to the reset input 26 of the bistable circuit. In addition, and in addition the operation of the bistable circuit 23 controls the switching device 15 in the above-mentioned control loop, a switching device 22 which connects the inverting input of the comparator 13 to ground potential as well as the AND-gate 14 at the output of the comparator 13.

Figure 2:
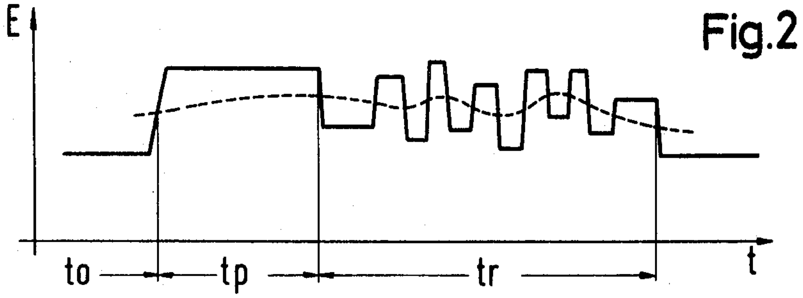
FIG. 2 shows a typical signal pattern during the scanning of line-coded data by means of a light pencil scanner and reading of the data means of an optical reader.

FIG. 2 illustrates a typical signal sequence provided, when a label is scanned at the input 10 of the circuit arrangement shown in FIG. 1, showing a signal amplitude E as a function of time t. The signal sequence as a function of time is divided into three sections, *to*, *tp*, and *tr*. The section *to* corresponds to the quiescent state of the circuit arrangement shown in FIG. 1 in which the switching devices 15 and 20, which are normally closed switches, are closed. The time period *tp* characterizes the start of the scanning motion of the reading stylus, i.e., the phase in which the reading stylus is placed on a label, but does not scan any information bits as yet. The time period *tr* characterizes the information phase in which the reading stylus is led over the information bits and supplies a bivalent signal pattern which is to be translated into an pulse train with fixed level values.

It is evident that the signal pattern altogether reproduces two reflection values of the information carrier which in a manner predetermined by the distribution of the data, alternate between the state "white" and the state "black" and thus, supply different signal amplitude values E. These signal amplitude values have a signal frequency which varies with time, and these variations can be caused by the causes above-described. The result is that the information signals have superimposed thereon a unidirectional time-varying component which is shown in FIG. 2 as a dashed line. The signal which is shown in FIG. 2 as a dashed line. The signal amplitude values E oscillate on either side of this unidirectional time-varying component. It is possible to distinguish reliably between "white" and "black" areas when in addition to the signal pattern, a threshold value is fed to the comparator 13 in the arrangement illustrated in FIG. 1, which threshold value in the ideal case runs like the unidirectional time-varying component which in FIG. 2 is shown in dash line. The invention makes it possible to generate a threshold value which very closely approaches the ideal waveform so that the logic circuits which are coupled at the output side of the arrangement shown in FIG. 1 can evaluate a pulse train of constant pulse amplitude which exactly represents the original data. It is to be pointed out that the data have not necessarily to be arranged as black marks on a white information carrier, one can likewise choose other colors since the signal amplitude values merely depend upon the contrast between the information bits and the information carrier background.

Figure 3:
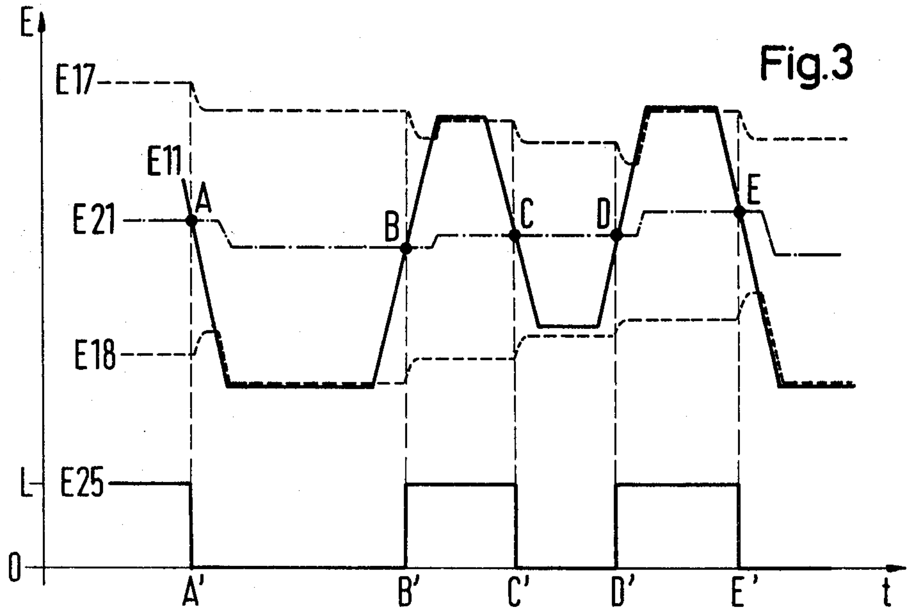
FIG. 3 shows a typical waveform of threshold value according to the invention and the impulse train generated thereform.

FIG. 3 illustrates the manner in which the pulse train E25 supplied at the output 25 of the evaluation circuit is correlated with the signal sequence E11 to be processed. This graph of FIG. 3 is helpful to explain above all the type of signal processing effected by means of the circuit arrangement shown in FIG. 1, which processing takes place in the information phase *tr* in which the two switching devices 15 and 12 are opened by a signal of the bistable circuit 23, the approximation circuit 19 operates with a small time constant, and the attenuation circuit 20 is switched off.

The signals E11 of the input amplifier 11 are fed to the non-inverting input of the comparator 13 as well as to the maximum value store 17 and also to the minimum value store 18. Thereby, the maximum value store 17 may have a storage content which in FIG. 3 is shown by the start of the upper dashed line E17. Likewise, it may be assumed that as a result of a certain signal amplitude value having been previously stored, the minimum value store 18 has a storage content which in FIG. 3 is depicted by he start of the lower dashed line E18. The mean value circuit 21 which is connected with the two stores 17 and 18 generates the mean value of both storage contents E17 and E18 and feeds this value as threshold value or reference voltage to the inverting input of the comparator 13. This value is shown in FIG. 3 by the start of the medium dash-dotted line E21.

The above-described initial state of the two stores 17 and 18 and of the mean value circuit is retained until the signal E11 fed from the input amplifier 11 passes into the comparator 13 through the threshold value at point A. Thereby, the comparator 13 switches to its initial state, for example, from the binary value 1 to the binary value 0, thus generating a decreasing edge of the impulse train E25 at the output of the ANDgate 14 which is shown at the lower part of FIG. 3 until the point of time A' has been reached. Simultaneously, this occurrence results in a condition for the switching-in of the approximation circuit 19 by the control circuit 24 for a predetermined time so that the two storage contents E17 and E18 approach each other by a corresponding predetermined relative amount, as is shown in FIG. 3. With regard to the maximum value store 17, this change of the storage content takes place in the direction of the signal transition and is shown in FIG. 3 by a corresponding decrease of the level of the upper dashed line E17. The change of the storage content E18 of the minimum value store 18 does not affect the subsequent formation of a mean value because in the minimum value store 18, there is read-in the actual minimum signal amplitude value which follows the signal transition and which results from the dropping direction of the signal transition. Thus, the approximation with respect to the storage content E18 occurs only tentatively until the storage content E18 is "enlarged" by the actual signal value and until the signal renders this part of the approximation ineffective.

As soon as the actual minimum signal amplitude value circuit 21 generates the mean value has been reached, the mean value E21 between the reduced storage content E17 of the maximum value store 17 and the actual minimum value of the signal amplitude in the minimum value store 18. Thus, the mean value E21 is displaced downwards with respect to the level of point A and supplies to the comparator 13 a threshold value, which causes the initial state of the comparator 13 to switch from its binary state 0 to its binary state 1 as soon as the signal E11 passes through the threshold value at the next signal transition at the point B. The change of the output signal associated therewith is shown in the lower part of FIG. 3 until the point of time B' has been reached. This passing through of the threshold value once more causes a brief switching in of the approximation circuit 19 so as to cause again the two storage contents to approach each other by a predetermined amount. The already described aperations are then repeated, however, in opposite direction corresponding to the different direction of the signal transition. The lower part of FIG. 3 illustrates the additional pulses which are generated at the output 25 when the threshold value E21 is crossed at the points C, D, and E at the points of time C', D', and E'.

The adequate effect of the circuit arrangement in the case of considerably decreasing signal modulation is clearly shown in FIG. 3 for the area B-C-D. Here exists a decrease of the signal modulation which exceeds the amount of approach of the two storage contents so that the signal waveform E11 no longer reach the storage content E18. The difference between the signal modulations which thus occurs is practically reached in two steps when the storage content E18 is diminished at each signal transition. It is evident that between the points C and D, the actual minimum value of the signal amplitude E11 does not reach the waveform E18 of the storage content of the minimum value storage 18 which is shown by a dashed line, and that consequently, the threshold value obtained is that which was generated between the points B and C. Despite this temporary "inaccuracy," an unobjectionable recognition of the changing signal amplitude is ensured even though there is a high loss of signal modulation. Likewise, reaching an even smaller signal amplitude would be possible with a higher degree of approach. The steps of the waveform E18 becoming progressively smaller clearly show that because of its relative dimension, the degree of approach becomes smaller when the signal modulation decreases.

Furthermore, FIG. 3 shows that the threshold value E21 has a "traveling" characteristic, i.e., it lies between the mean value of the respective preceding signal transition and the immediately following actual extreme value of the signal E11. The result is that even great losses of signal modulation cannot prevent a satisfactory recognition of changing signal states.

The end of the signal sequence is detected by logic circuits (not shown) which are connected to the output terminal 25 or, if desired, is detected by a special information bit which causes the generation of a normalizing signal which is fed to the resetting input 26 of the bistable circuit 23. Thereby, the switching devices 15 and 20 are closed again.

Figure 4:
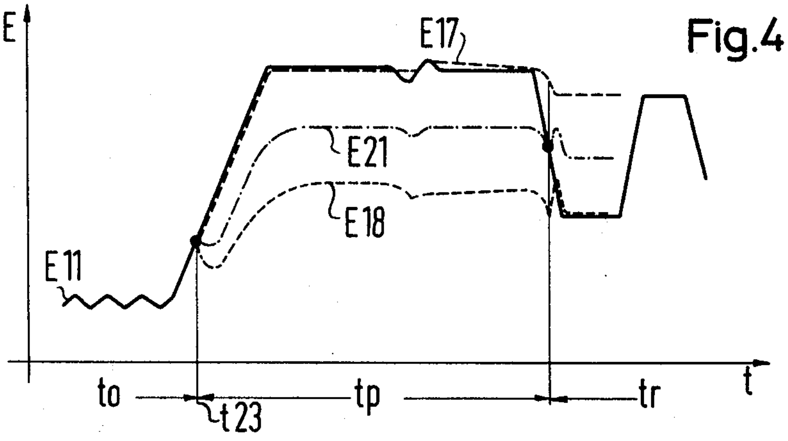
FIG. 4 shows a typical waveform threshold value obtained during scanning of a signal pattern situated ahead of line-coded data, whereby the signal amplitude is essentially constant.

This condition of the circuit arrangement is provided for the time phase to which corresponds to the state of non-data signals. The signal waveform associated therewith is shown in FIG. 4. During the quiescent state to, no signal is fed to the input 10 of the switching arrangement. The control loop passing through the switching device 15 and the control value storage 16 is closed. In addition, the switching device 22 at the inverting input of the comparator 13 is closed and connects this input with zero potential. The switching device 22 has for purpose to prevent the operations of the control loop, as will be described therein after, from being disturbed by a traveling threshold value. The control loop compensates for drift phenomena and offset voltages of the input amplifier 11 which can be larger than the superimposed unidirectional time-varying component of the scanning signal sequence. It is to be noted that electronically operating switches are preferably provided for the switching devices 15 and 22.

When the output of the input amplifier 11 (FIG. 1) drifts to positive values, the output of the comparator 13 likewise takes in a positive direction which, however, is of no effect because the AND-gate 14 at the circuit output 25 is open during the quiescent state. The positive output state of the comparator 13 generates a positive level at the inverting input of the amplifier 11 with the result that at its output, there occurs again a change to negative values which lasts until the switching threshold of the comparator 13 has been traversed. The comparator then switches its output state to the opposite signal resulting in a negative level at the inverting input of the amplifier 11 by which the state at the amplifier output is again changed to positive values until the switching threshold of the comparator 13 is traversed again. Thus, such a type of oscillation is produced in the control loop that the output state of the input amplifier 11 oscillates about the switching threshold of the comparator 13 with correspondingly smaller values. This action is shown at FIG. 4 by an oscillating waveform E11 during the phase to. When at a subsequent point of time, the switching device 15 in the control loop opens, the control value amplifier 16 maintains the control value reached before whereby the control value generated last is retained at the input of the control amplifier 11 during the information phase *tr*. The duration of this control value storage is adapted to the comparatively short information phase *tr*.

At the start of the preliminary phase *tp* in which the reading stylus is put on a blank portion of the information carrier, the signal waveform E11 jumps towards a maximum value so that the maximum value store 17 supplies at its value so that the maximum value store 17 supplies at its output a value E17 proportional to this first signal modulation. Thereby, the bistable circuit 23 is actuated so that the switching devices 15 and 22 are opened at the point of time *t*23 and the circuit arrangement reaches the already-described switching state with respect to these switching devices. Of course, the large time constant of the approximation circuit 13 is still switched in and the attenuation circuit 20 is operative. the change-over of the time constant in the approximation circuit 19 as well as the switching off of the attenuation circuit 20 are effected by the control circuit 24 only when a pulse occurs at the output of the AND-gate 14.

During the preliminary phase *tp*, the approximation circuit 13 operates with a relatively large time constant which is chosen to be smaller than the shortest expected time period of the preliminary phase, but not smaller than the longest time period of the first signal transition of the information phase. During the preliminary phase *tp*, the store content E18 of the minimum value storage 18 slowly reaches the value which is also contained by the maximum value store 17. However, this value is effectively reduced by the attenuation circuit 20 so that, for example, only 50 percent of it becomes effective. This pattern is illustrated at FIG. 4 by the lowest dashed line E18. The slow ascent of this line corresponds to the large time constant which during the preliminary phase *tp*, has been switched in until the point of time t23 has been reached.

The store 18 content of the minimum value storage is attenuated because during the preliminary phase *tp*, the threshold value as mean value between the storage content E17 of the maximum value store 17 and the storage content E18 of the minimum value 18 is so chosen that it falls about in the middle of the anticipated first edge of a signal transition. The thus generated threshold value E21 is shown in FIG. 4 by a dash-dotted line. Its height can be chosen according to the above requirement whereby an empirical value of a maximum possible contrast reduction or a corresponding loss of signal modulation is taken into account.

The large time constant of the approximation circuit 19 during the preliminary phase *tp* has the effect that during this phase, level changes of the signal waveform E11 do not lead to traversing the threshold value E21. Moreover, the relatively brief signal transition at the start of the information phase *tr* before crossing the threshold value E21 does not cause any fast adjusting of the storage content E17 of the maximum value store 17 to the following minimum value because otherwise, the threshold value E21 would "run away" from the signal waveform E11 and never could be crossed. FIG. 4 also shows a short-time disturbance of the signal waveform E11 which on account of the approximation circuit 19, manifests itself in a temporary dropping of the threshold value E21 that advantageously causes an increase in the signal-to-noise ratio.

At the start of the preliminary phase *tp*, there occurs a signal transition from the depicted high signal amplitude value to a lower signal amplitude value whereby the effective store content E18 of the minimum value storage 18 first follows this signal pattern drop. On account of the still active attenuation circuit 20, this effect is correspondingly diminished as shown in FIG. 4. The threshold value E21 shows the same trend, however, the corresponding change is halved by the formation of the mean value between the values E17 and E18. The threshold value is then crossed by the signal transition which at the output of the AND-gate 14 supplies the criterion for the effective switching of the control circuit 24. The control circuit 24 switches the time constant of the approximation circuit 19 from a high value to a low value and renders the attentuation circuit 20 inoperative. From this point of time on, the storage content E18 of the minimum value store 18 travels with the declining signal edge. By the changeover of the time constant, the approximation becomes manifested by a correspondingly faster lowering of the storage content E17 so that the mean value E21 follows a changed pattern as shown in FIG. 4. Afterwards, the same action occurs as has been already described for the information phase *tr*.

Figure 5:
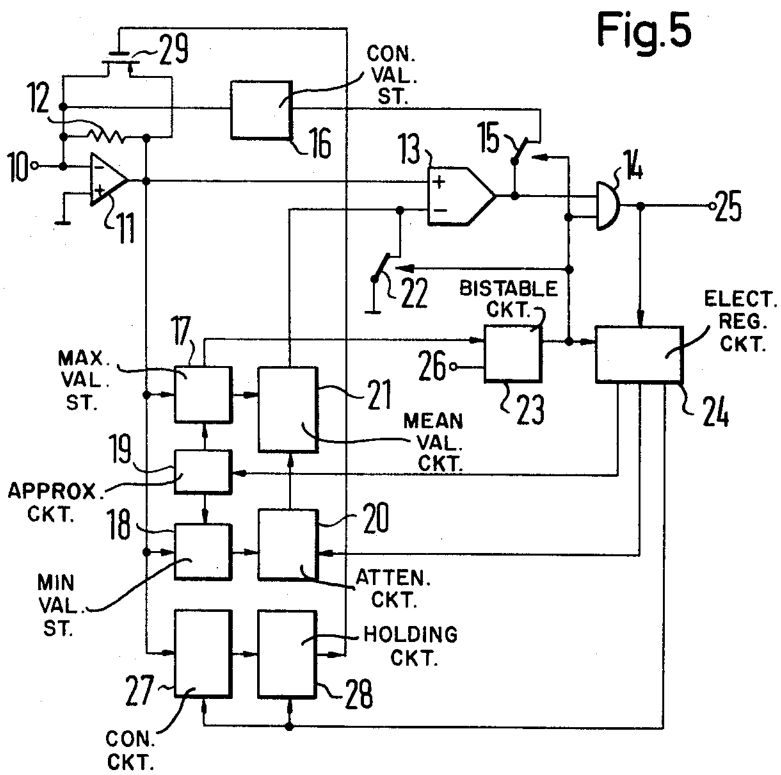
FIG. 5 shows a block diagram of a modification of the circuit arrangement illustrated in FIG. 1 presenting the advantage of permitting the processing of signals having a wider dynamic range.

FIG. 5 shows another example of a circuit arrangement for carrying out the process according to the invention. This arrangement is especially suited for the processing of scanning signals having a very large dynamic range. The principle difference between this and the one shown in FIG. 1 is that it is additionally provided with a control circuit 27, a holding circuit 28, and a field effect transistor 29. The circuits 27 and 28 are connected to the control circuit 24 in order to adapt their mode of operation to that of the rest of the arrangement. The field effect transistor 29 is preferably a MOS-FET and is excellently suitable as an adjustable resistance, the value of which is determined by its gate potential. In the quiescent state, the MOS-FET 29 is cut off and the resistance 12 alone determines the sensitivity of the system.

After the reading stylus has been placed on an information carrier as has been already described with the aid of FIG. 1, the increasing signal at the output of the amplifier 11 is limited to a certain predetermined value by reason of the fact that the control circuit 27 includes a comparator having a comparison input which is connected with the output of the amplifier 11. When the predetermined value is exceeded, a control signal is fed via the holding circuit 28 to the MOS-FET 29 whereby the latter becomes so strongly conductive that the gain of the amplifier 11 is reduced to a value which, at the output of the amplifier 11 and therewith thereby at the input of the control circuit 27 barely generates the predetermined limiting value so that the latter is just not exceeded.

The holding circuit 28 has for function to store the control signal value for the MOS-FET 29 which has been determined when the reading stylus is placed on an information carrier because it may be assumed that the signal amplitude does not substantially change from the placing of the stylus to the end of the measuring phase.

In order that the signal changes occurring during the measuring phase are also taken into account, the holding circuit 28 may include a discharge resistance which during the measuring phase reduces the control signal for the MOS-FET 29 and thus, increases its internal resistance so that the gain of the amplifier 11 is again increased. Thereby, signal patterns which decrease during the measuring phase are corrected by the increasing gain to reach the desired predetermined limit value of the signal level.

Besides, when the signal modulation increases, the control circuit 27 becomes effective again since upon the exceeding of the predetermined limit value, the control circuit increases the control signal for the MOS-FET 29 until the signal level again falls below the limit value.

When the limit value is so fixed that it corresponds to a signal modulation which can be still easily processed by the rest of the circuit arrangement, then, the dynamic range of the useful signal can be considerably enlarged by relatively simple means. Thus, one can process a possible upper value of the input signal which amounts to about 6 or 7 times the upper input signal value for the circuit arrangement shown in FIG. 1.

The function of the remaining components shown in FIG. 5 corresponds to the function of the similarly designated components in FIG. 1 so that further description is unnecessary. The characteristics which have been described with the aid of FIGS. 2, 3 and 4 also pertain to the arrangement shown in FIG. 5.

We claim:

1. A method for generating a pulse sequence signal of constant pulse amplitude from a bivalent signal having transitions between a maximum and a minimum amplitude value and having a superimposed unidirectional time-varying component, said method comprising the steps of comparing said signal with a controlled threshold value which is traversed by said signal at each transition thereof, storing the amplitude value of said signal present ahead of each transition, generating a mean value from said maximum and minimum amplitude values during a period of time following the beginning of a transition and employing said means value as the controlled threshold value for the next signal transition.

2. The method of claim 1 wherein the storage of the signal amplitude value is continued at least until the end of the next succeeding signal amplitude value.

3. The method of claim 1 wherein the signal amplitude values are fed to a minimum value store and a maximum value store having storage contents which at each signal transition are approximated to each other by a predetermined amount which is adjusted relative to the difference between the storage contents.

4. The method of claim 3 wherein an approximation is carried out for a time adjusted according to said predetermined relative amount using a time constant which at most is equal to the shortest expected duration of a signal transition.

5. The method of claim 3 for the evaluation of bivalent signal sequences, preceded each time by a signal pattern having essentially constant signal amplitude, wherein during each such preceding signal pattern the contents of the maximum value store and of the minimum value store are made to approach one another with a time constant which is larger than the longest expected duration of the signal transition following said preceding signal pattern and having a considerably smaller time constant than the shortest expected preceding signal pattern, and effecting a reduction of the effective storage content of the minimum value store in the direction of the signal transition occurring at the start of the preceding signal pattern.

6. The method of claim 1 wherein the stored signal amplitude value is modified by a predetermined amount in the direction of the first-named signal transition before generating said mean value.

7. The method of claim 6 wherein the traversing of the controlled threshold value by the signal during a signal transition is employed as the criterion for determinging the beginning of the modification of the respective stored signal amplitude value.

8. Signal processing apparatus for generating a pulse sequence signal of constant pulse amplitude from a bivalent signal having transitions between a maximum and a minimum amplitude values and having a superimposed unidirectional time-varying component, said apparatus comprising an input amplifier to which the bivalent signal is fed, a comparator having one input fed from said amplifier and a reference input fed from a mean value circuit, stores for storing maximum and minimum values of said signal, a mean value circuit for producing a mean value from the contents of the stores and an approximating circuit adapted to influence said stores, said approximation circuit being activated for appropriate periods of time by signal transitions accuring at the output of said comparator and being adapted to produce a predetermined degree of approximation.

9. The apparatus of claim 21 further comprising a control loop leading from the comparator output to the input of the amplifier and including a control value store and a normally closed switching device for opening and closing the loop, said switching device being opened by a bistable circuit actuated by the appearance of a first predetermined signal amplitude value in said store for storing said maximum value.

10. The apparatus of claim 9 further comprising a regulating circuit controlled by said bistable circuit and by the generated pulse train produced by said apparatus said regulating circuit being adapted to switch at the start of a signal pattern having an essentially constant signal amplitude the approximation circuit from a small time constant to a large time constant simultaneously with an attentuation circuit which is coupled to the output side of said store for storing said minimum value.

11. The apparatus of claim 9 wherein the reference input of the comparator is connected through an additional switching device controllable by said bistable circuit for applying a zero potential.

12. The apparatus of claim 11, further comprising means for generating a normalizing signal at the end of the signal sequence which is fed to the resetting input of the bistable circuit.

13. The apparatus of claim 8 wherein the output of the input amplifier is connected to a control circuit, said control circuit being adapted to generate a signal influencing the gain of the input amplifier as a function of the amplitude of the signal at the output of said amplifier.

14. The apparatus of claim 13 wherein the output of said amplifier is connected to the input terminal through a variable resistance value which is controlled by the signal generated by said control circuit.

15. The apparatus of claim 14 wherein said variable resistance is a field effect transistor.

16. The apparatus of claim 13 wherein said control circuit has an output coupled to a holding circuit for maintaining the control signal influencing the gain of the amplifier to proximate its initial value in the course of a measuring phase.

17. The apparatus of claim 13 wherein said control circuit comprises a comparator having a input and adapted to generate a signal reducing the gain of the input amplifier when a predetermined signal value at the output of said amplifier is exceeded.

* * * * *

UNITED STATES PATENT OFFICE

CERTIFICATE OF CORRECTION

Patent No. 3,846,623 Dated Nov. 5, 1974

Inventor(s) Norbert Wefers et al.

It is certified that error appears in the above-identified patent and that said Letters Patent are hereby corrected as shown below:

Col. 1, line 10, delete "purpose";
Col. 5, line 20, delete "Pattern" and insert --pause--
line 31, after "transition" insert --is going to be--;
Col. 6, line 40, delete "inverting";
line 67, delete "storages" and insert --stores--;
Col. 7, line 16, delete "and in addition the operation of--;
line 19, after "loop," insert --and in addition the operation of--
line 49, delete "The signal";
line 50, delete "which is shown in FIG. 2 as a dashed line--;
Col. 8, line 23, delete "he" and insert --the--.
Col. 8, line 62, delete "circuit 21 generates the mean value";
line 63, after "value" insert --circuit 21 generates the mean value--
Col. 9, line 12, delete "aperations" and insert --operations--
Col. 10, line 43, delete "value so the maximum value store 17"
line 44, delete "supplies at its";
Col. 10, lines 51 and 58, delete "13" and insert --19--;
Col. 11, line 6, delete "store 18" and insert --storage--;
line 6, delete "storage" and insert --store 18--;
line 10, after "value" insert --store--;
Col. 12, line 19, delete "therewith";
Col. 13, lines 42 and 43, correct the spelling of --determining--
Col. 14, line 7, delete "21" and insert --8--.

Signed and sealed this 4th day of February 1975.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

PATENT NO. : 3,846,623
DATED : November 5, 1974
INVENTOR(S) : Norbert Wefers, et al It is certified that error appears in the above-identified patent and that said Letters Patent are hereby corrected as shown below:

On the list of inventors, please delete "Jan de Meer" and insert --Joachim Schwarzkopf--.

Signed and sealed this 24th day of June 1975.

(SEAL)
Attest:

RUTH C. MASON
Attesting Officer

C. MARSHALL DANN
Commissioner of Patents and Trademarks